United States Patent [19]
Fuller et al.

[11] 3,727,177
[45] Apr. 10, 1973

[54] SHORT SCHULER ATTITUDE/HEADING REFERENCE SYSTEM

[75] Inventors: Frank J. Fuller, Granada Hills; Donald E. Walters, Oxnard, both of Calif.

[73] Assignee: The United States of America as represented by the Secretary of the Navy

[22] Filed: Nov. 24, 1971

[21] Appl. No.: 201,664

[52] U.S. Cl. .................. 340/2, 33/361, 33/397, 340/3 PS
[51] Int. Cl. .............................. G01c 17/18
[58] Field of Search .............. 33/310, 352, 361, 33/363, 397; 340/2, 3 PS

[56] References Cited

UNITED STATES PATENTS 1,270,178  6/1918  Lehtinen ........................ 33/352
2,755,562  7/1956  Hurlburt ........................ 33/363
3,022,462  2/1962  Keiper, Jr. ..................... 340/2 X Primary Examiner—Richard A. Farley
Attorney—Richard S. Sciascia et al.

[57] ABSTRACT

A pair of sensors each responsive to changes in the earth's magnetic field are orthogonally mounted with respect to each other and suitably electrically connected and pumped to provide signals representative of their heading. Mounting the two sensors each on a separate bob of a compound pendulum minimizes inductive mutual coupling and erroneous signals while the pendulum serves as a stable vertical reference from which the relative orientation of the chips are determined. Suspending a sonobuoy carrying the compound pendulum and sensors a considerable distance below the water surface from a sparbuoy via an elastic line tends to block the transfer of vertical and lateral accelerations to ensure that the compound pendulum provides a more stable vertical reference.

8 Claims, 5 Drawing Figures

/ PATENTED APR 10 1973

FRANK J. FULLER
DON E. WALTERS
INVENTORS

BY

THOMAS GLENN KEOUGH
ERVIN F. JOHNSTON
ATTORNEYS

SHORT SCHULER ATTITUDE/HEADING REFERENCE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Conventionally, sonobuoys, large floating buoys, and other unattended data gathering platforms must include some mechanism for indicating their relative orientation. A sonobuoy having its hydrophone array operating in the passive mode needs a device for indicating the direction of a source of remotely originating target signals to enable the transmission of usable data by a remote control center. A conventional compass with a suitably electronic coupling is included in some sonobuoys to provide a reference direction. However, when the compass is vertically and laterally accelerated in response to surface wave action "bowl swirl" of the compass's liquid introduces errors of several degrees. Additionally, this compass becomes unstable when tilted from side to side as the sonobuoy bobs about in response to the surface chop. Another problem confronting the designers of unattended monitoring stations is how to conserve the self-contained power supply to increase the period of operation. Since sonobuoys are usually quite compact, the power supply or bank of batteries necessary to sustain passive monitoring and transmission of data is necessarily small. Obviously, any means by which the power drain is reduced improves and prolongs operation. Magnetic sensors have been used to provide an indication of the sonobuoy's orientation, but their power requirements are such as to permit only intermittent actuation. One magnetometer reference mechanism drives magnetic field sensor elements along their major hysteresis loops. This approach consumes a relatively high amount of driving power and tends to sacrifice directionability and sensitivity. None of the conventional magnetometers conserve power and improve their resolution by being pumped around a minor hysteresis loop. None of the sensors combine the stable vertical reference afforded by a compound pendulum with the increased sensitivity of a pair of orthogonally arranged permalloy chips.

SUMMARY OF THE INVENTION

The invention is directed to providing an apparatus for indicating the directional orientation of a sonobuoy and includes a framework pivotally carried in the sonobuoy having a cross member orthogonally pivotally secured to the framework. A compound pendulum is mounted on the cross members and a pair of bobs are disposed at its opposite extremes. A pair of moment arms connect them to a common fulcrum located at their common point of connection on the cross member. An element responsive to changes in a magnetic field generates a representative signal and is carried on each of the bobs in an orthogonally disposed relationship with respect to each other. Suitable electronic coupling is included to provide signals indicative of the directional orientation of the sonobuoy.

It is an object of the invention to provide an attitude reference indicator having high directional sensitivity.

A further object is to provide a highly stable indicator using a compound pendulum as its vertical reference.

Another object of the invention is to provide a directional reference indicator being relatively insensitive to tilt and ambient accelerations.

Yet another object is to provide a directional reference sensor having its sensor elements orthogonally disposed and physically separated from each other to minimize the possibility of inducing cross coupling.

Still another object is to provide a passive stable vertical reference not drawing on the power supply of a bank of batteries.

These and other objects of the invention will become more readily apparent from the drawings when taken with the ensuing description.

DESCRIPTION OF THE PREFERRED EMBODIMENT

Figure 1:
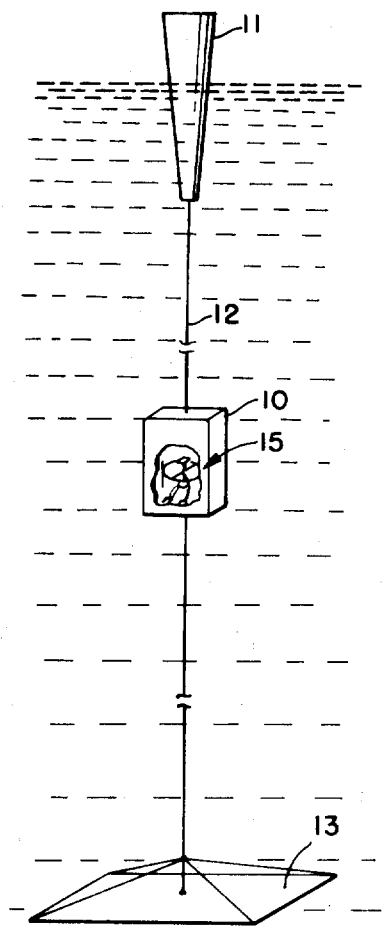
FIG. 1 is an isometric depiction of the invention operationally deployed.
Figure 2:
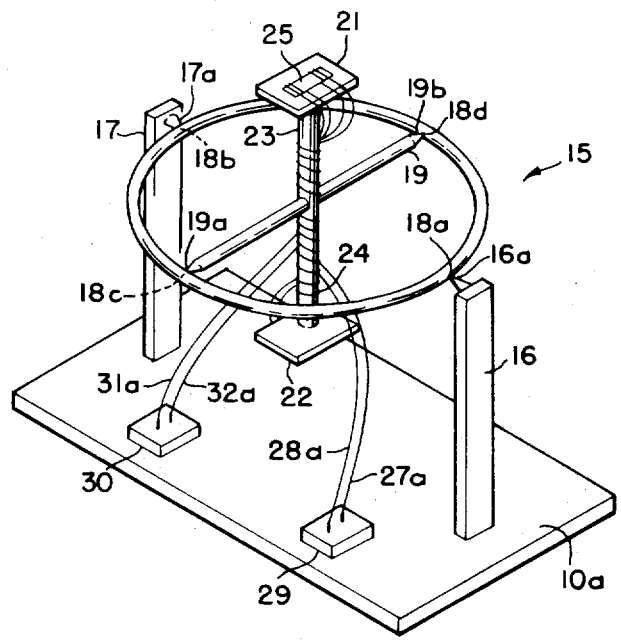
FIG. 2 is an isometric view of the invention.

Referring now to the drawings, a representative sonobuoy 10 is shown disposed more than 100 feet below the surface of the ocean. In accordance with a number of such sonobuoys, it includes a hydrophone array having an omnidirectional listening capability and most suitably employed in the passive mode to conserve the power expenditure from a self-contained bank of storage batteries. A sparbuoy 11 disposed at the water-air interface is configured for minimal reaction to surface waves and houses transponder circuitry and a transmitter for relaying signals representative of the impinging acoustic energy. Optionally, the sonobuoy is suspended from the sparbuoy by a long elastic line 12 which flexes as the waves displace the sparbuoy to dampen the transmission of vertical displacements to the suspended buoy. Toward this end, additional stability is aided by hanging a sea anchor 13 formed with a relatively large vertically facing plane beneath the sonobuoy.

For the data monitored by the hydrophone array to have any meaningful value to a remotely located monitoring station, the direction of remotely originating target signals with respect to the sonobuoy must be made known. That is to say, the sonobuoy must generate a signal indicating its relative orientation and include such a signal along with the target information data transmitted to the remote station.

It is to the generation of such a reference signal that the present invention is directed. The directional orientation device 15 is supported on a base 10a inside the sonobuoy. A pair of vertically reaching support posts 16 and 17 are each provided with an inwardly facing spur 16a or 17a. The posts and spurs are selected from materials which do not adversely interact with the earth's magnetic field or with the internally induced fields. The spurs terminate in a sharpened point and are processed to possess a hardness for reducing friction at their points of engagement with an annular framework 18.

A set of outwardly facing recesses 18a and 18b are appropriately dimensioned to accommodate the spurs and are similarly preprocessed with their inner surfaces hardened to provide a relatively friction-free axis about which the framework rotates on the spurs. Fashioning the framework from an aluminum or magnesium material reduces the inertial drag of the framework, the reason for which will be elaborated on below.

Orthogonally disposed to the axis defined between the spurs, a cross member 19 extends across the framework and terminates in a pair of coaxial needle points 19a and 19b. A set of inwardly facing recesses 18c and 18d are shaped in the framework and receive the needle points with all accommodating surfaces being hardened and smoothed to allow friction-free rotation.

The cross member, also fabricated from the lightweight stock defines a second axis at right angles with the axis reaching between the spurs to provide a gimbal support for a compound pendulum 20. Like most compound pendulums, the pendulum chosen has been selected having a first and a second bob 21 and 22 each carried on the outwardmost extremes of a moment arm 23 or 24.

Compound pendulums have long demonstrated that a period of oscillation can be increased significantly without a corresponding increase in size by appropriately ratioing the masses of the two bobs and the ratios of the moment arms. A compound pendulum having a natural period of 84.4 minutes has been hypothesized and demonstrated in the Schuler pendulum which possesses the same period of a simple pendulum having a length equal to the earth's radius. The Schuler pendulum has an unique property in that the pendulum arm remains vertical despite any motions or accelerations of its pivot to ideally lend itself as being a stable vertical reference for navigational instruments. While certain inertial guidance systems have adapted the principal of the Schuler pendulum by including electronic compensating accelerometers or gyro stabilizers, there has been no attempt to construct a Schuler pendulum from passive structural elements having no servo controlled compensation. Although the ratios and the dimensions required in a Schuler pendulum are within tolerances not physically possible in the current state of the art, a compound pendulum can be fabricated suitable for use in present case which establishes a stable enough vertical reference for sonobuoy use where a long suspension system complements the effectiveness of the compound sensor pendulum. A compound pendulum having a period of more than 30 seconds has been assembled in the present case; however, in practice the sensor compound pendulum would have a period of almost 10 seconds to counteract the tension effects of connecting wires, and the normal 10 second period of the water damped elastic suspension system isolates the sensor compound pendulum from surface water disturbances. The long suspension system is in itself a long pendulum (e.g., 100 feet long) with a period of almost 10 seconds. In effect there is a long simple pendulum which terminates in a sensor compound pendulum. A more thorough analysis of the theory behind a long period compound pendulum is presented in two articles "Little Pendulums that Oscillate Like Big Ones" by C. L. Stong, *Scientific American*, April, 1967, Pages 124–128 and "Schuler Pendulum," *McGraw Hill Encyclopedia of Science and Technology*, Vol. 12, 1971, Pages 100–101.

A compound pendulum not requiring electronic compensation or gyro stabilization preferably is selected as the stable reference since the presently disclosed configuration does not draw upon the limited reserves of an onboard battery supply. A compound pendulum suitably weighted and dimensioned ensures adequate stability and is free from error caused by slight motions or tilting to the sonobuoy. Although, ideally, a compound pendulum possessing the capabilities of a Schuler pendulum to maintain its alignment with the earth's center irrespective of vertical and lateral accelerations is desirable, for the present application a compound pendulum used in conjunction with a long suspension system is adequate where directional resolution of plus or minus three degrees is acceptable.

Figure 3:
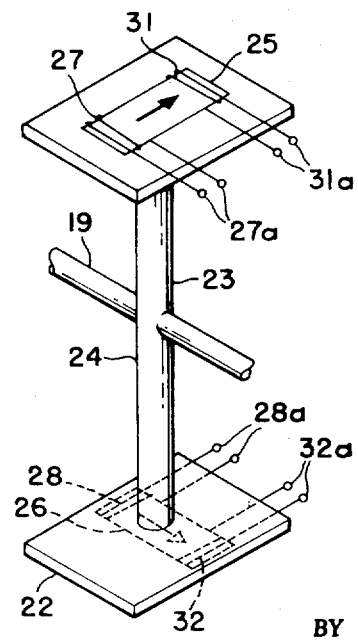
FIG. 3 is a schematical representation of the sensor elements as carried on the compound pendulum.
Figure 3A:
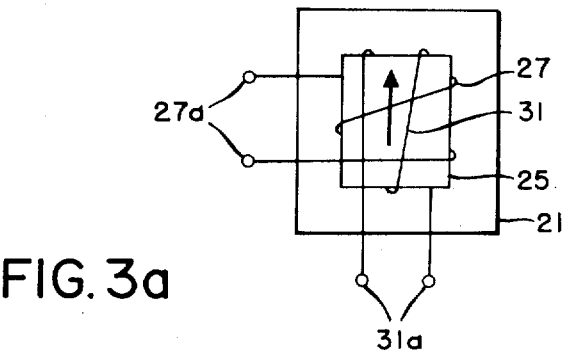
FIG. 3a shows an alternate manner of orienting the sensor and pumping coils.

The directional sensitivity of the invention is owed to the inclusion of the permalloy chips 25 and 26 carried on the outwardmost surfaces of the first and second bob. The permalloy chips preferably selected are two Ampex thin-film 78–22 nickel-iron alloy. The "easy axis" of each of the two chips is oriented at right angles with respect to the other and are secured in place on their respective bobs (noting the representation of the "easy axes" in FIG. 3 as being in the arrow direction). Pumping coils 27 and 28 are disposed about their respective chips and induce varying signals in secondary sensor coils 31 and 32 as a function of chip orientation with respect to magnetic north. The pumping coils are driven by an appropriate oscillator circuit schematically represented by reference character 29 via fine leads 27a and 28a. The leads are fine wires with such small dimensions such as to be considered weightless and imposing no significant tension on the reference effect of the pendulum.

In alignment with the pumping coils, sensor coils 31 and 32 are wrapped about their respective chip 25 or chip 26 and a pair of weightless fine leads 31a and 32a reach from the coils to correlation circuitry 20. Conventional circuits for correlating monitored circuits with some reference signal are in wide application and the invention makes use of such a circuit in the instant application. Here it should be pointed out that the mass of the chips and coils is taken into consideration when preselecting the desired moment ratios since instability results if the proper relationship is not maintained.

Figure 4:
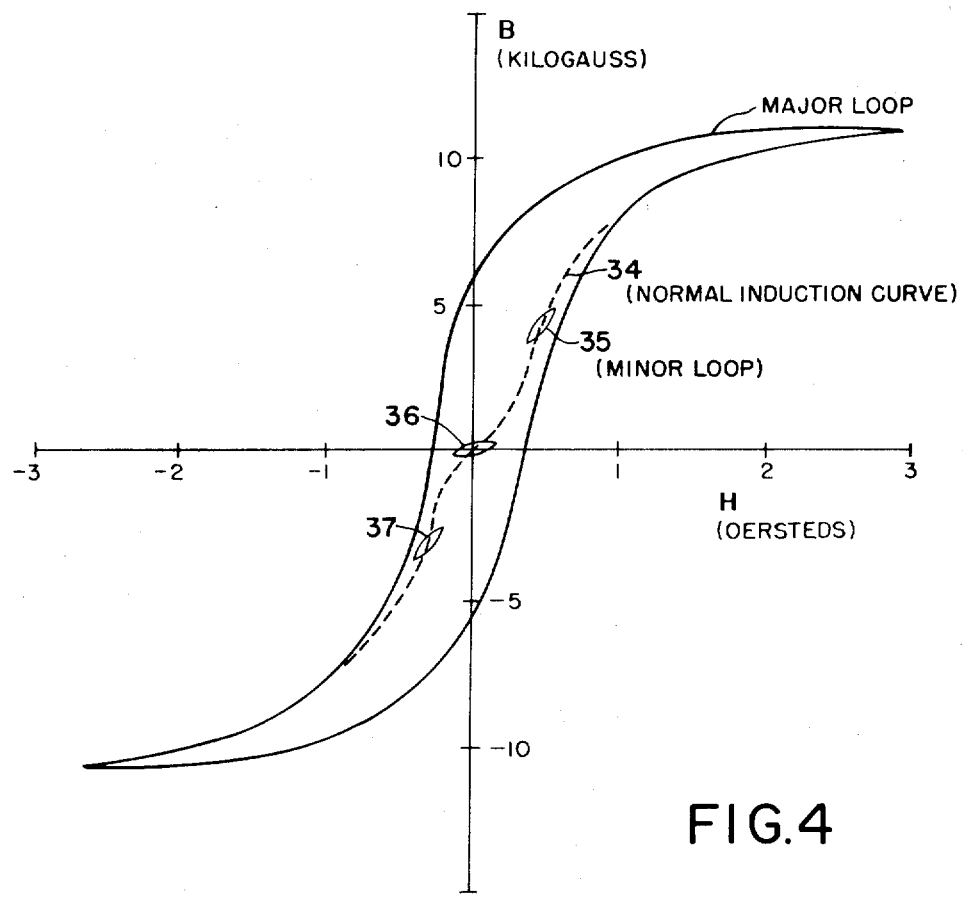
FIG. 4 is a graphical representation of a sensor's hysteresis loop.

Permalloy sensors were found to be most satisfactory due to their high permea-ility, $10^5$, and their ability to provide considerable magnetic flux density changes in response to relatively small variations in the applied magnetic force. In FIG. 4, dotted line 34 represents a typical normal induction curve for a permalloy sensor. The design of the sensor is so chosen that the earth field will induce a maximum flux density in the chip which is less than one-half the saturation level. The pump drive is chosen so that in combination with the earth field, the total flux density induced does not exceed one-half the saturation level. While the earth flux picked up by the sensor may be on the order of 50,000 gammas (depending upon sensor orientation) the pump drive flux is a small fraction of the earth flux. The exact level of the pump flux will generally be on the order of 100 gammas peak-to-peak although it can be any value providing that the combination with the earth field it does not induce a sensor flux which exceeds one-half the sensor saturation level.

The vertical coordinate B (in FIG. 4) represents the flux induced due to the magnetizing force (H) on the horizontal coordinate. Minor loops are anchored to the normal induction curve and are generated by low pumping levels. The slope of the line connecting the tips of the minor loop depends upon the position of the minor loop on the normal induction curve as indicated by the three minor loops 35-37 in FIG. 4. This position of the minor loops and its slope are directly related to the strength of the earth field component picked up by the sensitive (easy) axis of the sensor. For example, if the sensor is oriented so that the effect of the earth field is zero, then the minor loop will be located at the origin of the induction curve and position of the minor loop on the normal induction curve and the slope of the line connecting the ends of the minor loop will change as indicated in FIG. 4. It is this slope change of the minor loop with sensor orientation that is utilized to provide a low-power sensitive compass capability. A sensor resolution of a fraction of a degree has been achieved under perfect vertical stabilization conditions, a compass accuracy of ±3° can be expected with vertical stabilization provided by the combination of the long suspension and sensor compound pendulum system.

As the orientation of the chip with respect to the earth's magnetic field changes, that is, as the sonobuoy is rotated, different indications, i.e., different positions and slopes of the minor loop occur along different portions of permalloy normal induction curve. When a chip is placed at right angles to the earth's field, the biasing force of the earth's field is nearly zero and the resultant slope of the minor loop is nearly zero.

The output signals appearing across the leads reaching from each sensor coil 31 and 32 when fed to a correlator circuit provide indications of the amplitude and phase information necessary to determine the orientation of the sonobuoy. Having the two chips orthogonally disposed with respect to each other eliminates ambiguities otherwise caused by a single such sensor being so employed.

Obviously, many modifications and variations of the present invention are possible in the light of the above teachings, and, it is therefore understood that within the scope of the disclosed inventive concept, the invention may be practiced otherwise than specifically described.

What is claimed is:

1. An apparatus for providing signals representative of the directional orientation of a sonobuoy comprising:
    a framework defining a first and a second axis orthogonally disposed with respect to each other and being pivotally secured along the first axis to the sonobuoy;
    a cross member laterally traversing and being pivotally secured to said framework in line with the second axis;
    a compound pendulum secured to said cross member at the point of intersection of the first and the second orthogonal axis to define a pendulum fulcrum including,
    a first bob carried on the end of a moment arm joined at its opposite end to said pendulum fulcrum, and
    a second bob carried on the end of a moment arm joined at its opposite end to said pendulum fulcrum and being aligned with the moment arm of said first bob; and
    a sensor element carried on both said first bob and on said second bob responsive to changes in the earth's magnetic field to provide representative signals indicative of said directional orientation of said sonobuoy.

2. An apparatus according to claim 1 in which the sensor elements are permalloy chips each having their easy axis orthogonally oriented with respect to each other for eliminating phase and amplitude ambiguities in said representative signals.

3. An apparatus according to claim 2 further including:
    a pumping coil coaxially disposed about each permalloy chip for inducing a low power magnetic field; and
    a sensor coil carried in the proximity of each permalloy chip inductively responsive to said low power magnetic field and the earth's magnetic field to provide said representative signals.

4. An apparatus according to claim 3 in which the moment ratio attributed to said first bob about said pendulum fulcrum with respect to said second bob about said pendulum fulcrum approaches unity ensuring vertical stability of said compound pendulum.

5. An apparatus according to claim 4 in which said apparatus is suspended from and remotely disposed from a sparbuoy at the water's surface to minimize the transfer of vertical and lateral accelerations to said compound pendulum.

6. An apparatus according to claim 5 in which said apparatus is suspended from said sparbuoy by an elastic support for damping said transfer of vertical and lateral accelerations.

7. An apparatus according to claim 3 wherein said permalloy chips are each characterized by a minor hysteresis loop and wherein said sensor elements are pumped around said minor hysteresis loops.

8. A stable suspension system in marine applications for an electronic compass sensor of the type used to provide directional orientation signals with respect to the earth's magnetic poles, comprising:
    a compound pendulum including a moment arm having a given period and a pivot therefor, for providing a vertical reference for said system;
    a simple pendulum having a period which is a large fraction of the given period of said compound pendulum;
    means suspending the pivot of said compound pendulum from said simple pendulum; and
    means mounting a directional magnetic field sensor on the moment arm of said compound pendulum.

* * * * *